United States Patent
Hui et al.

(10) Patent No.: US 9,602,159 B2
(45) Date of Patent: Mar. 21, 2017

(54) COMMUNICATION CHANNEL IDENTIFICATION IN A POWER LINE COMMUNICATION NETWORK

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 163 days.

(21) Appl. No.: 14/267,374

(22) Filed: May 1, 2014

(65) Prior Publication Data

US 2015/0318891 A1    Nov. 5, 2015

(51) Int. Cl.
| | |
|---|---|
| H04B 3/48 | (2015.01) |
| H04B 3/32 | (2006.01) |
| H04B 17/309 | (2015.01) |
| H04B 3/54 | (2006.01) |
| H04B 3/487 | (2015.01) |

(52) U.S. Cl.
CPC ............... *H04B 3/32* (2013.01); *H04B 3/487* (2015.01); *H04B 3/54* (2013.01); *H04B 17/309* (2015.01); *H04B 2203/5425* (2013.01); *H04B 2203/5466* (2013.01)

(58) Field of Classification Search
None
See application file for complete search history.

(56) References Cited

U.S. PATENT DOCUMENTS

| | | | |
|---|---|---|---|
| 8,515,382 B2 | 8/2013 | Schwager et al. | |
| 2008/0068217 A1* | 3/2008 | Van Wyk | G01D 4/004 340/870.11 |
| 2011/0090726 A1* | 4/2011 | Brotto | H02J 7/0065 363/131 |
| 2011/0280188 A1* | 11/2011 | Jeon | H04B 7/0413 370/328 |
| 2012/0161543 A1 | 6/2012 | Reuven et al. | |

(Continued)

FOREIGN PATENT DOCUMENTS

EP      2410665 A2    1/2012

OTHER PUBLICATIONS

Egan, J., "Multiple Input, Multiple Output Technology Accelerates Wired Home Networks", HomeGrid Forum White Paper, Version 1.0, Jun. 2012, 13 pages, HomeGrid Forum.

(Continued)

*Primary Examiner* — Huy D Vu
*Assistant Examiner* — Bao G Nguyen
(74) *Attorney, Agent, or Firm* — Parker Ibrahim & Berg LLC; James M. Behmke; Stephen D. LeBarron

(57) ABSTRACT

In one embodiment, a device in a network receives a message from a neighboring device that identifies the electrical phase on which the message was sent. Crosstalk is identified between the device and the neighboring device by determining that the message was received on a different electrical phase than the phase on which the message was sent. One or more distinct communication channels between the device and the neighboring device are identified based on the identified crosstalk with each communication channel including or more electrical phases.

16 Claims, 16 Drawing Sheets

(56) References Cited

U.S. PATENT DOCUMENTS

| | | |
|---|---|---|
| 2012/0182881 A1 | 7/2012 | Ananthakrishnan et al. |
| 2013/0051446 A1 | 2/2013 | Vijayasankar et al. |
| 2013/0215885 A1* | 8/2013 | Vijayasankar ........ H04L 1/0041 370/389 |
| 2014/0112400 A1* | 4/2014 | Reuven ................... H04B 3/56 375/258 |
| 2014/0191583 A1* | 7/2014 | Chisenga ................. H02J 1/10 307/82 |

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.
"ITU-T Unified high-speed wireline-based home networking transceivers—Multiple input/multiple output specification—G.9963", Jun. 22, 2012, pp. 1-90.
International Search Report and Written Opinion mailed Jul. 10, 2015 in connection with PCT/US2015/027938.

* cited by examiner

COMMUNICATION CHANNEL IDENTIFICATION IN A POWER LINE COMMUNICATION NETWORK

TECHNICAL FIELD

The present disclosure relates generally to power line communication (PLC) networks, and, more particularly, to identifying one or more communication channels based on observed crosstalk between electrical phases.

BACKGROUND

Low power and Lossy Networks (LLNs), e.g., sensor networks, have a myriad of applications, such as Smart Grid (smart metering), home and building automation, smart cities, etc. Various challenges are presented with LLNs, such as lossy links, low bandwidth, battery operation, low memory and/or processing capability, etc. For instance, LLNs communicate over a physical medium that is strongly affected by environmental conditions that change over time, and often use low-cost and low-power transceiver designs with limited capabilities (e.g., low throughput and limited link margin).

Shared-media communication networks, such as power-line communication (PLC) networks (a type of communication over power-lines), provide an enabling technology for networking communication and can be used for example in advanced metering infrastructure (AMI) networks, and are also useful within home and buildings. The transfer of alternating current (AC) electric power to the end users in such networks most frequently takes the form of three-phase electric power, where three current waveforms are produced that are generally equal in magnitude and 120° out of phase to each other. Typically, a device is connected to one or all three phases and may use any connected phase for purposes of communicating in the network. However, crosstalk effects may also be present in the network, causing a signal to propagate from the originating phase onto one or more other electrical phases. Accordingly, current techniques for communicating in multi-phase PLC networks offer significant room for improvement.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
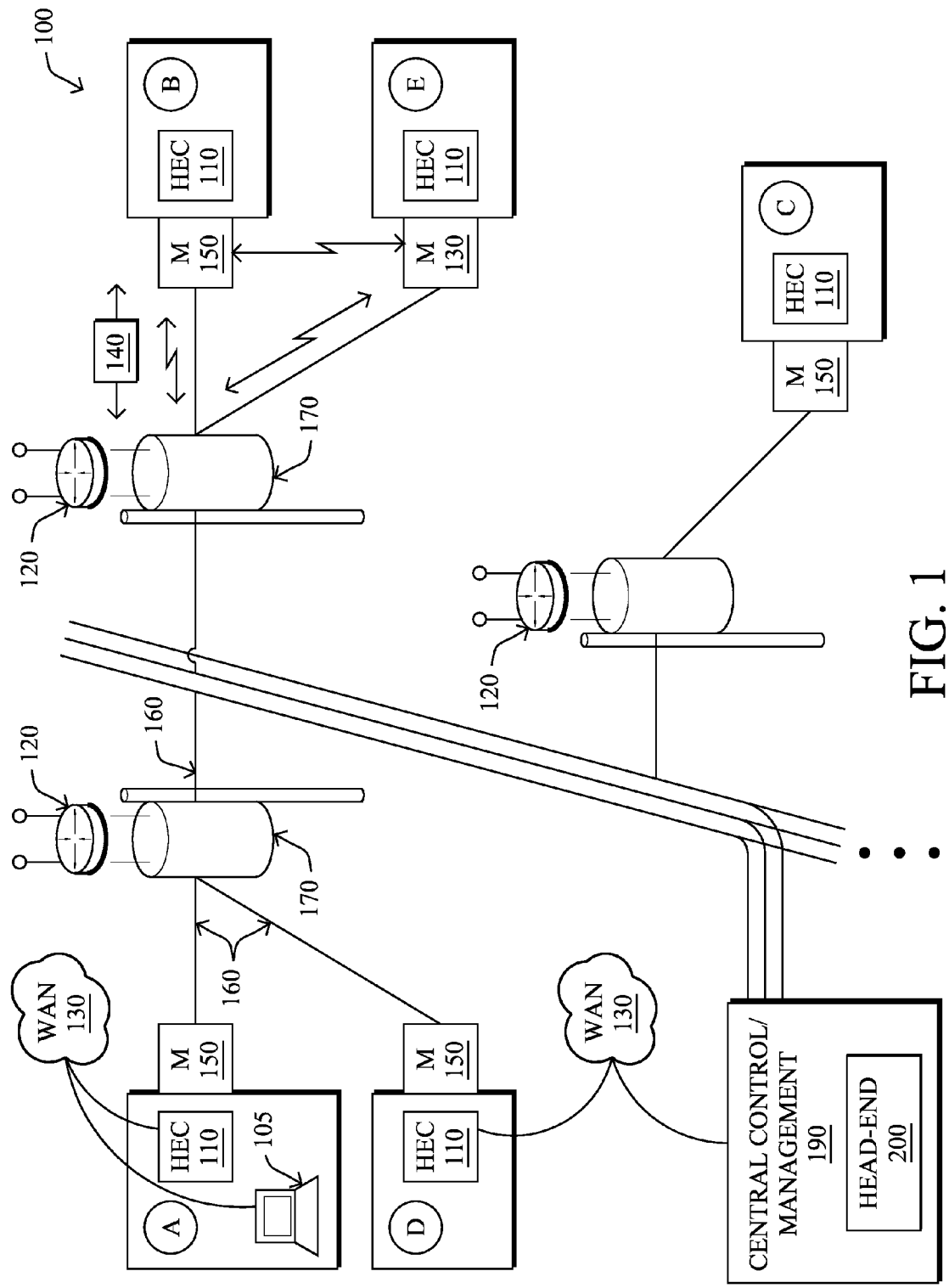
FIG. 1 illustrates an example network of devices shown with various communication and powering configurations.

According to one or more embodiments of the disclosure, a device in a network receives a message from a neighboring device that identifies the electrical phase on which the message was sent. Crosstalk is identified between the device and the neighboring device by determining that the message was received on a different electrical phase than the phase on which the message was sent. One or more distinct communication channels between the device and the neighboring device are identified based on the identified crosstalk with each communication channel including or more electrical phases.

Description

A computer network is a geographically distributed collection of nodes interconnected by communication links and segments for transporting data between end nodes, such as personal computers and workstations, or other devices, such as sensors, utility meters, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, in particular, are a specific type of network having spatially distributed autonomous devices such as sensors, actuators, etc. For example, sensor networks, such as for "Smart Grid" and "Smart Cities" (e.g., for Advanced Metering Infrastructure or "AMI" applications), may cooperatively monitor physical or environmental conditions at different locations, such as, e.g., energy/power consumption, resource consumption, etc. Another type of smart object includes actuators, e.g., responsible for turning on/off an engine or perform any other actions. Generally, smart object networks may include any type of device that is able to communicate information on a computer network, such as household appliances (air conditioners, refrigerators, lights, etc.), industrial devices (heating, ventilating, and air conditioning (HVAC), pumps, motors, etc.), and other "smart" devices.

That is, smart object networks are typically interconnected by a communication network, such as a wireless network, though wired connections are also available, and may often consist of wireless nodes in communication within a field area network (FAN). For instance, each smart device (node) in a smart object network may generally be equipped with a radio transceiver or other communication port, a microcontroller, and an energy source, such as a battery (or, in particular to the embodiments herein, a distribution grid power source). Typically, size and cost constraints on sensor nodes result in corresponding constraints on resources such as energy, memory, computational power and bandwidth. Correspondingly, a reactive routing protocol may, though need not, be used in place of a proactive routing protocol for sensor networks.

FIG. 1 is a schematic block diagram of an example simplified network 100 of devices illustratively comprising various communicating and non-communicating devices. For example, power-lines 160 may bring electrical grid power from respective transformers 170 into homes/businesses/etc., generally via a meter 150. In addition, "pole-top" routers 120 may communicate data packets 140 (e.g., traffic and/or messages) with other communicating nodes/devices of the network 100. For instance, the links between the devices may be wired links (e.g., for power-line communication) or may comprise a wireless communication medium. A home energy controller (HEC) 110 or other energy controller may be present at certain locations, and may be in communication with the meters 150, pole-top routers 120, or else directly to another computer network, e.g., WAN 130, similar to conventional computers 105. In addition, a centralized control center or management center 190 may be present in the network 100, such as at an electrical grid company's centralized location, and may be in communication over power-lines 160 and through WAN 130.

Those skilled in the art will understand that any number of nodes, devices, links, etc., as well as any different (and suitable) type of nodes, devices, links, etc., may be present in the network, and that the view shown herein is for simplicity and is not meant to limit the scope of the embodiments herein. In fact, those skilled in the art will appreciate that countless arrangements of power grid components and communicating devices may be established.

Figure 2:
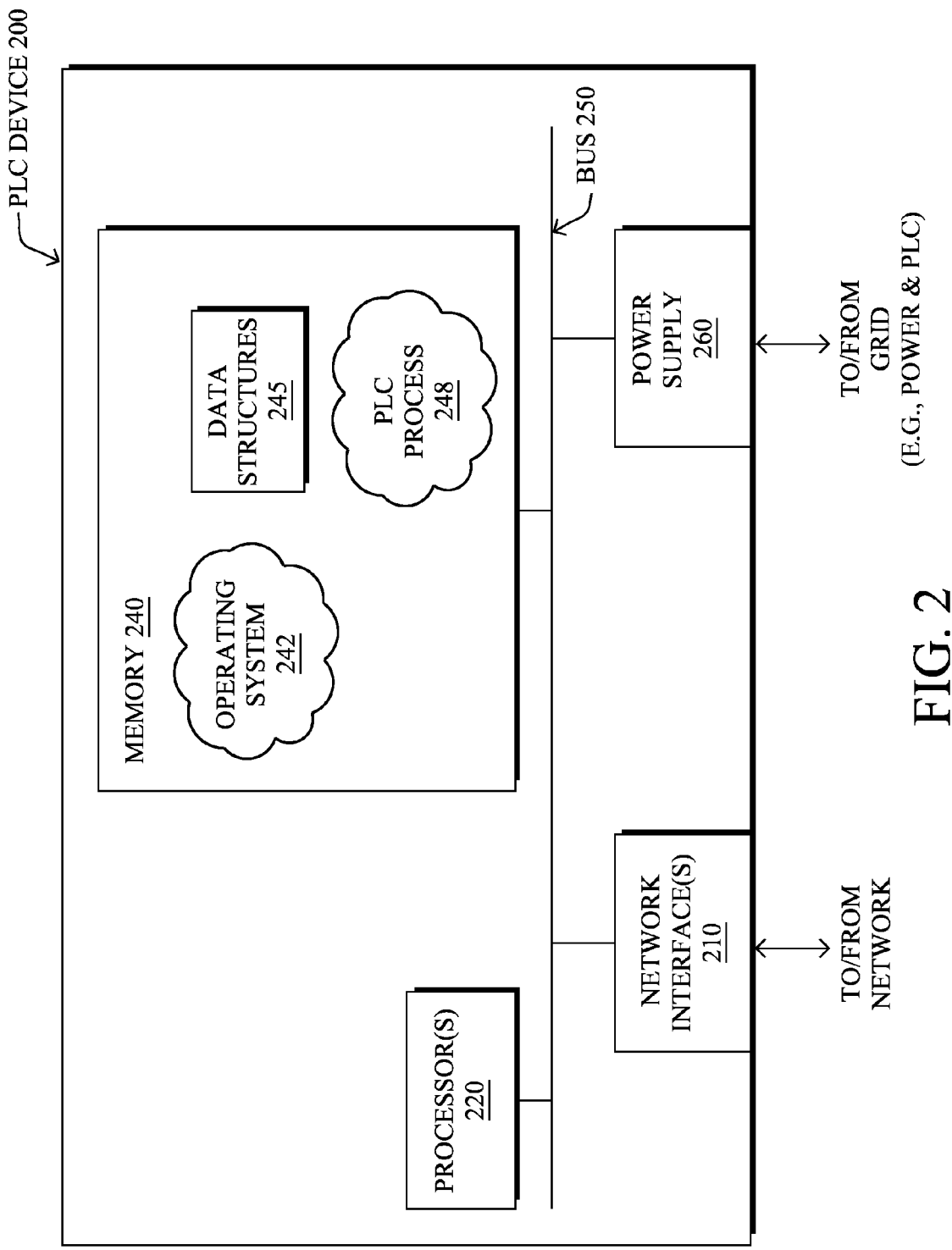
FIG. 2 illustrates an example device/node.

FIG. 2 is a schematic block diagram of an example PLC node/device 200 that may be used with one or more embodiments described herein. For example, PLC device 200 may correspond to a router 120 or smart meter 150 shown in FIG. 1, or another such device configured to communicate in network 100 using a PLC protocol. The device 200 may comprise, as a simple representation, a network interface 210, a processor 220, and a memory 240 interconnected by a system bus 250. Notably, PLC device 200 may also be powered by a power supply 260, such as a battery, a "plug-in" power supply, and/or a power supply that receives electric power from a power grid. For example, if PLC device 200 is a pole-top router, PLC device 200 may be powered directly by the power lines supported by the pole.

The network interface 210 contains the mechanical, electrical, and signaling circuitry for communicating data over physical and/or wireless links coupled to the network 100. The network interface may be configured to transmit and/or receive data using a variety of different communication protocols, including, inter alia, various wired or wireless protocols, powerline communication (PLC) protocols, broadband over power lines (BPL), etc. In cases in which device 200 is connected to multiple electrical phases in the power grid, network interface 210 may be configured to communicate over any or all of the connected phases using a PLC protocol. In one embodiment, network interface 210 comprises a single front-end that is multiplexed across the different electrical phases. In another embodiment, network interface 210 comprises separate front-end modules for each connected electrical phase.

The memory 240 comprises a plurality of storage locations that are addressable by the processor 220 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. As shown, for example, operating system 242 may invoke a PLC process 248 to handle the reception and/or transmission of PLC messages from other devices on the network. Note that although the PLC process 248 is shown within central memory 240, certain embodiments provide for the PLC process 248 to be a part of the network interfaces 210, and the embodiment shown is not meant to limit the techniques herein.

As noted above, electric power is generally transmitted from generation plants to end users (industries, commercial, residential, etc.) via a transmission grid consisting of a network of power stations, transmission circuits, and substations interconnected by power lines. From the transmission grid, power may then be distributed to end users via a distribution system. Once at the end users, electricity can be used to power any number of devices, such as end-point devices. The transmission and distribution of alternating-current (AC) electric power to the end users most frequently takes the form of poly-phase electric power, a common form of which being three-phase electric power. For smaller customers (e.g., households) usually a single phase is taken to the property. For larger installations (large houses, buildings), all three phases may be taken to a distribution panel, from which both single and multi (two or three-phase) circuits may be fed.

Figure 3:
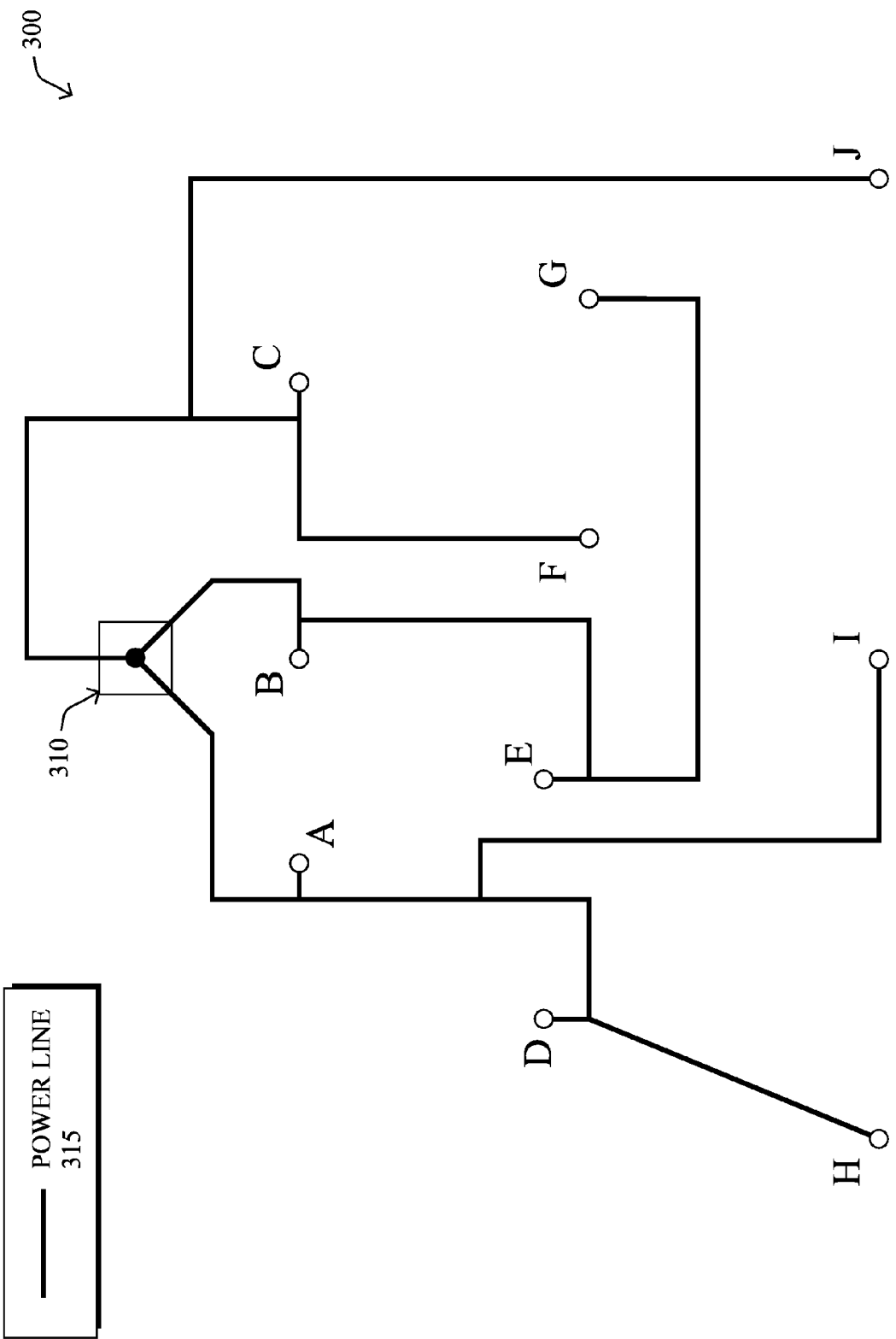
FIG. 3 illustrates an example electric power distribution system.

FIG. 3 illustrates a vastly simplified view of an example electric power transmission and distribution grid 300 to the example devices of FIG. 1, above. For instance, a distribution center 310 supplies electricity over a plurality of power lines 315 (e.g., power-lines 160) to the devices at locations "A" through "J".

Figure 4:
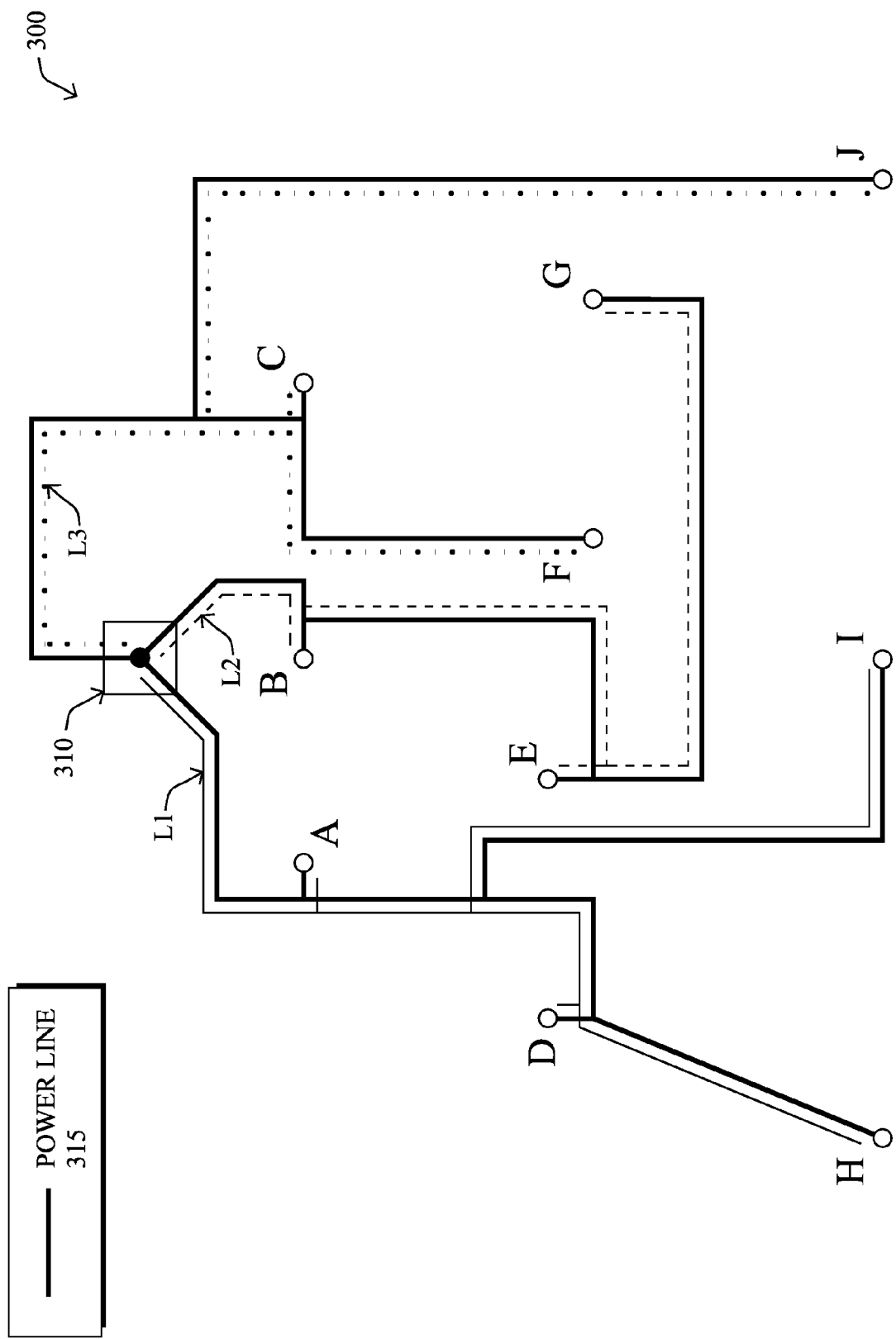
FIG. 4 illustrates an example poly-phase electric power distribution of the system shown in FIG. 3.

In the embodiments herein, the supplied electricity is part of a poly-phase source system, where a plurality of phases (e.g., three) are transmitted onto the lines 315 to the devices, such that each device is generally attached to a particular phase of the electric grid. As shown in FIG. 4, therefore, electrical power of three phases, L1, L2, and L3, is supplied to the locations A-J (a neutral/ground may be shared by the phases). Notably, as mentioned above, the view shown herein is vastly simplified, as each phase may generally be used to power entire buildings, neighborhoods, etc., and may also supply power to many (e.g., tens, hundreds, thousands) of devices within those establishments. Also, while the view shown herein is generally arbitrarily connected, phase-based distribution grid topologies generally result in "clusters" of like-phased devices (e.g., those within the buildings, neighborhoods, etc.).

Figure 5B:
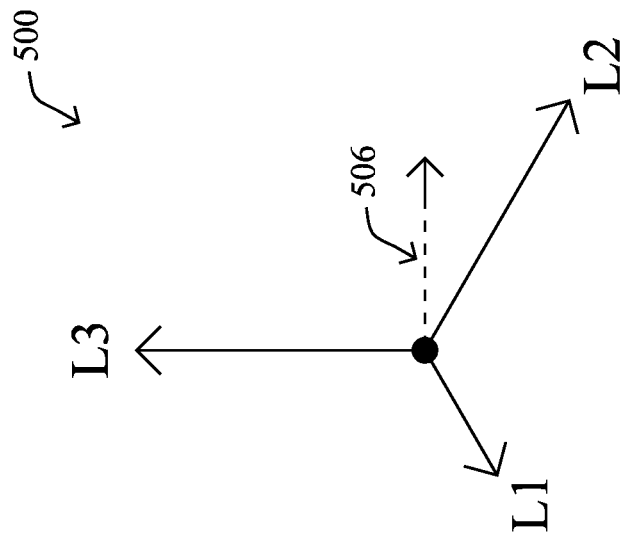
FIGS. 5A-B illustrate example phase representations of the poly-phase electric power distribution system shown in FIGS. 3-4.
Figure 5A:
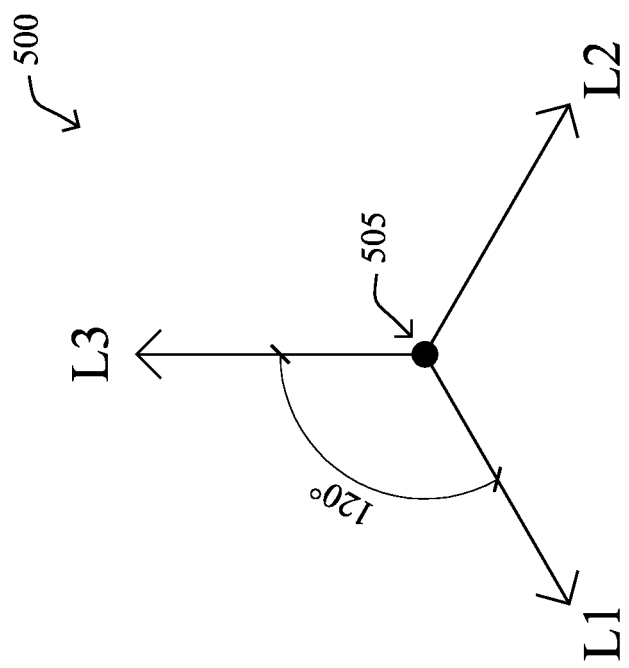

FIG. 5A illustrates an example phase representation 500 of the distribution grid's electrical power. In particular, three current waveforms are illustratively produced (L1, L2, and L3) that are generally equal in magnitude and 120° out of phase to each other. The currents returning from the end users to the supply transformer all share the neutral wire (neutral point 505). If the loads are evenly distributed on all three phases, as they are in FIG. 5A, the sum of the returning currents in the neutral wire is approximately zero. Any unbalanced phase loading such as in FIG. 5B, however, may result in a current 506 at the neutral point, which may cause inefficient use of transformers, vibrations in generators, or other problems, including (but not limited to) brown-outs or black-outs in extreme cases. There are many factors that may create imbalance between the phases, such as excess load usage, downed power lines, etc.

Devices in a PLC network may communicate information, such as metering data, to other devices in the network over one or more electrical phases connected to a device. One link technology for smart grid AMI networks is defined in the IEEE 1901.2 PLC protocol. IEEE 1901.2 specifies an orthogonal frequency division multiplexing (OFDM) physical layer that increases overall throughput and robustness across a noisy and unpredictable medium. Using such a protocol, a device on the power grid (e.g., a field area router or the like) that is connected to any or all of the electric power phases may communicate with other devices in the power grid via the phases connected to the device.

Figure 6A:
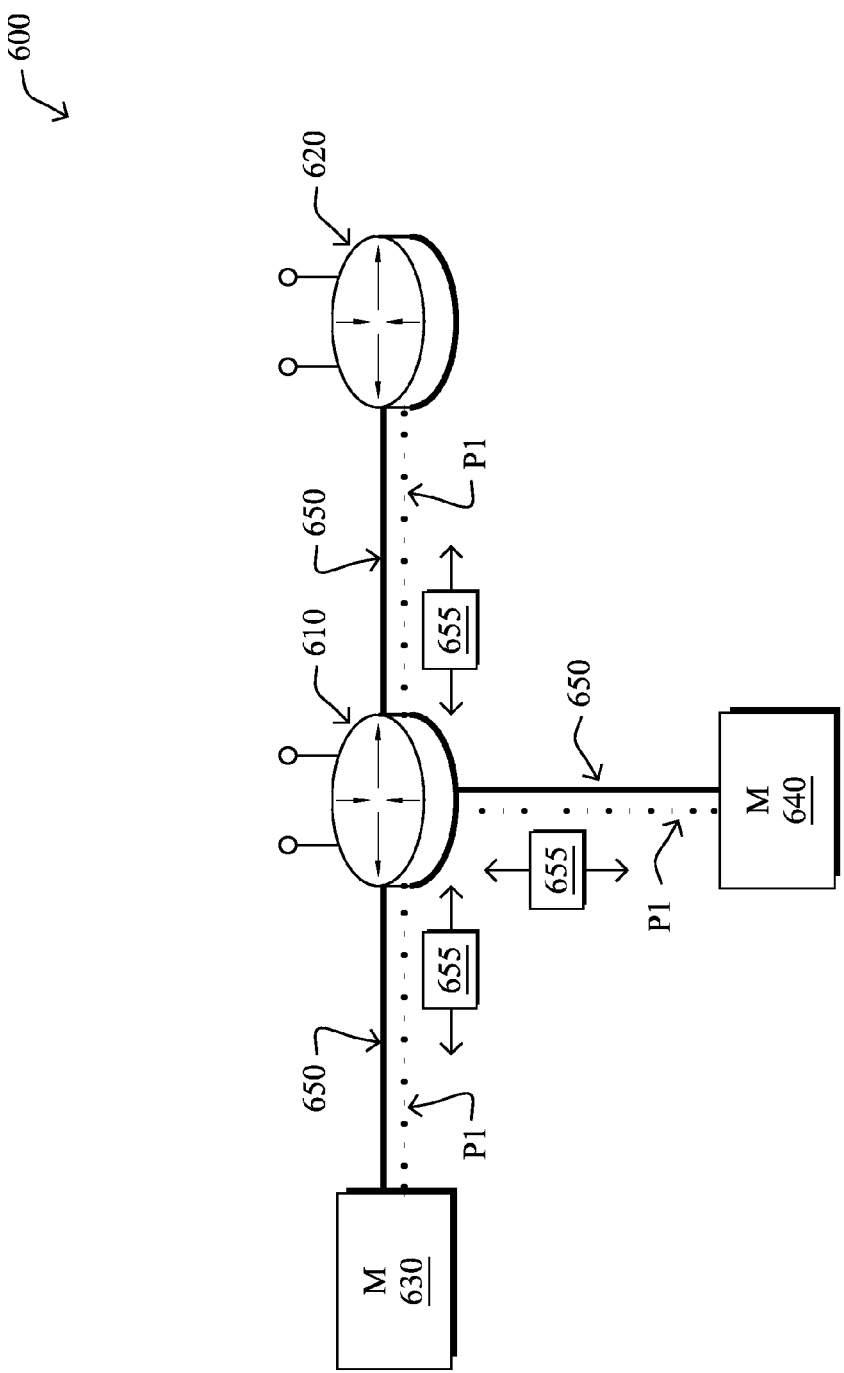
FIGS. 6A-6C illustrate a simplified example of messages being sent on different electrical phases.
Figure 6B:
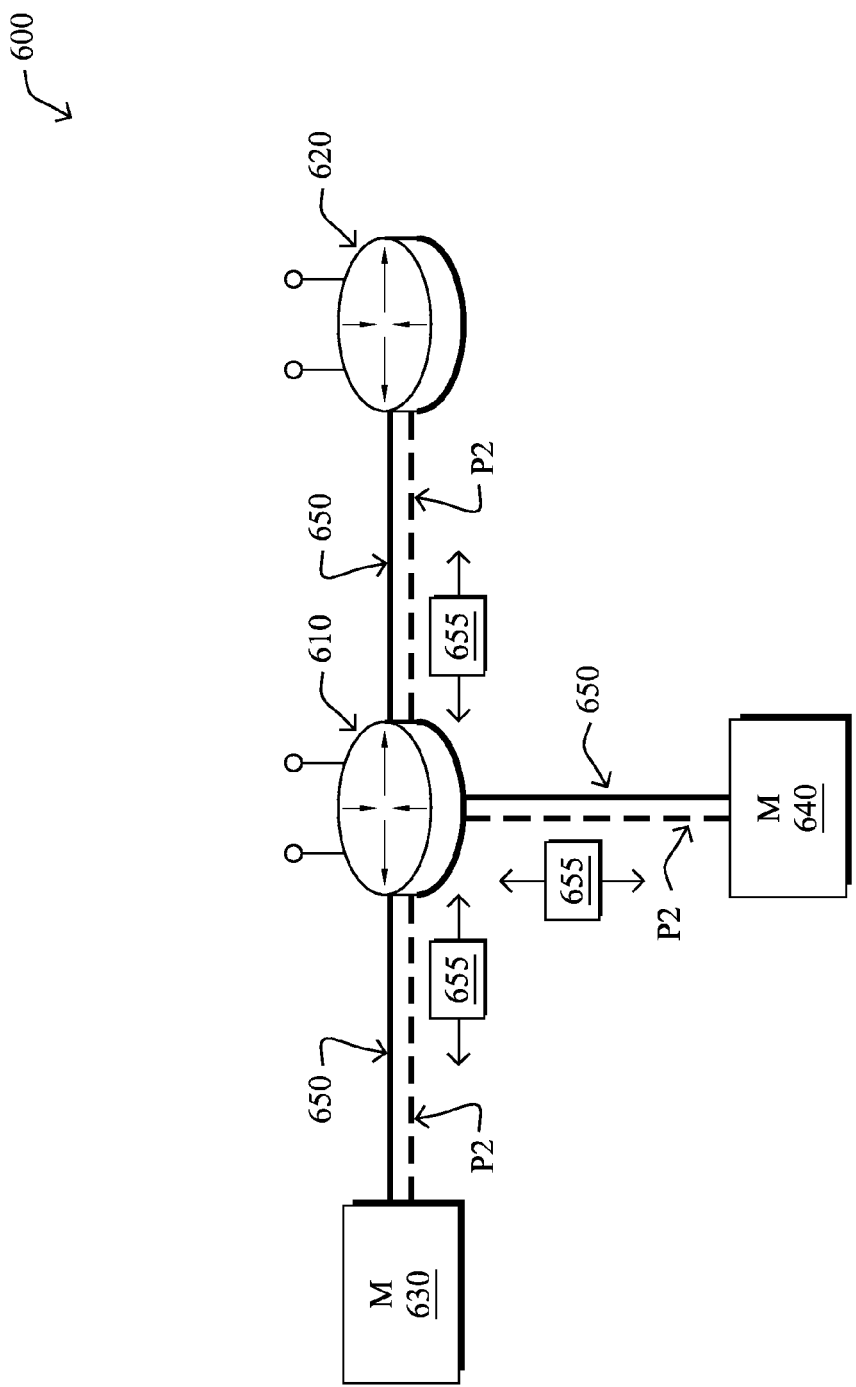
Figure 6C:
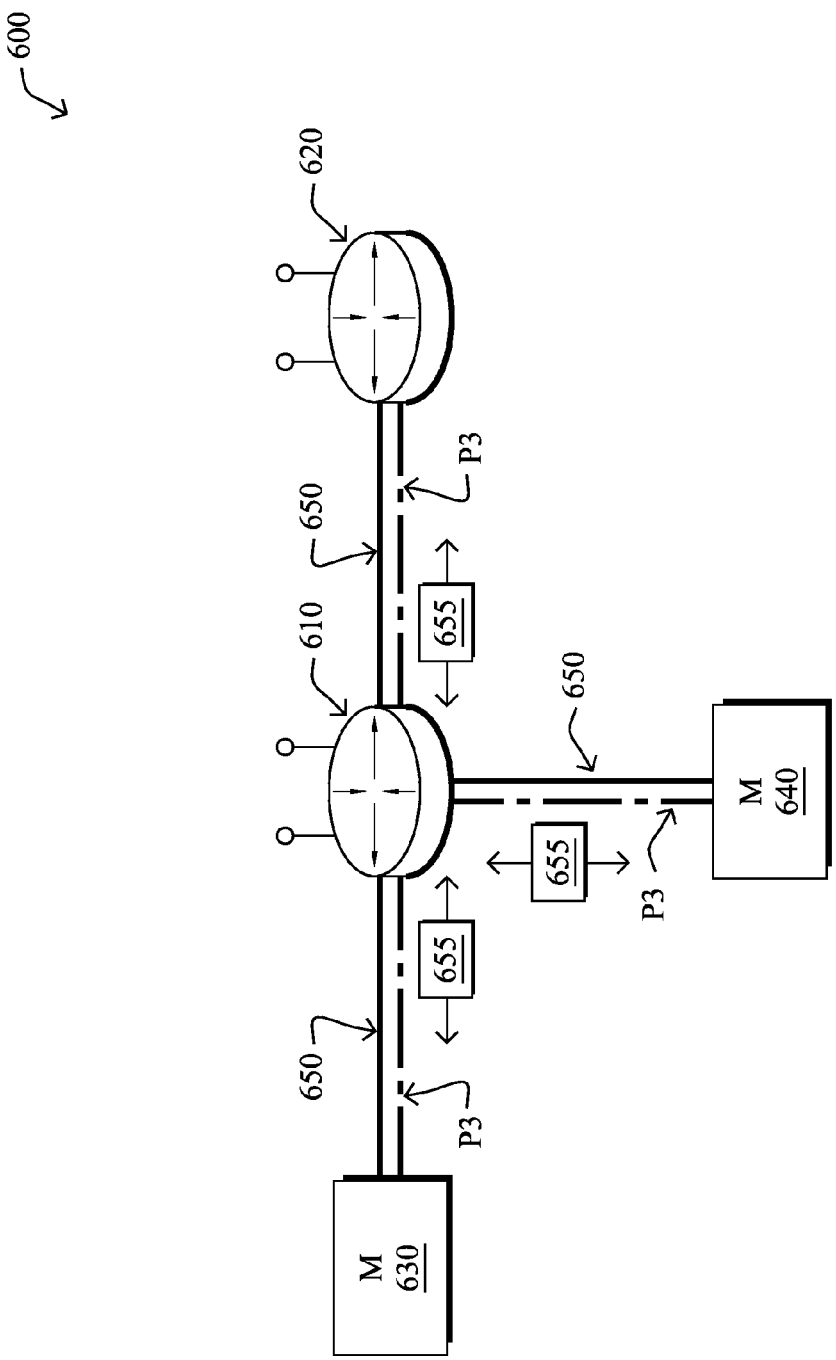

FIGS. 6A-6C illustrate a simplified example of messages being sent on different electrical phases. As shown in FIG. 6A, network devices 600 may exchange messages 655 on a particular phase P1 of power delivered by the electric grid. For example, router 610 may receive and/or transmit messages 655 to or from any of smart meters 630, 640 and router 620 on phase P1 via physical links 650.

According to various embodiments, each of network devices 600 may comprise an interface that can dynamically transmit/receive on each connected phase individually. In other words, the interface allows the network device to switch between different electrical distribution phases or transmit/receive signals on multiple phases simultaneously. As illustrated in FIGS. 6B-6C, any or all of network devices 600 may transmit and/or receive messages 655 on electrical phases P2 and P3, in addition to that of phase P1. For example, messages 655 may be communicated between network devices 600 on any or all of phases P1-P3. As would be appreciated, the configurations of devices 600 are illustrative only and that a particular device may be connected to any number of electrical phases (e.g., one phase, two phases, etc.).

As noted above, cross-talk effects may be present in a PLC network, leading to a message being sent on one electrical phase and propagating onto one or more other phases. For example, metering device 630 may send a particular communication to router 610 via phase P1 that propagates onto phase P2 and/or phase P3 due to the presence of crosstalk effects. Thus, while a network device may be able to communicate simultaneously on different electrical phases, crosstalk effect may cause messages sent on different phases to interfere with one another.

Communication Channel Identification in a PLC Network Using Crosstalk Data

The techniques herein provide a method for maximizing the effectiveness of poly-phase PLC links that are capable of transmitting and receiving on different electric phases simultaneously. In one aspect, a node discovery/beacon mechanism may be used to transmit a beacon message on each phase connected to a device. Such a beacon may include information regarding which phase was used for transmission. Crosstalk effects may then be measured by the receiving device by comparing the transmission phase to the reception phase(s). The crosstalk information may be used to identify how many distinct communication channels exist between a device and a neighboring device. If possible, multiple packets may be sent in parallel over different communication channels when multiple communication channels exist between neighboring devices. In another aspect, identified crosstalk may be included in a Tone Map Response (TMREP) message and may be stored in the link neighbor table of a device. In some cases, a Tone Map Request (TMREQ) and TMREP exchange may be used to actively probe a link when sending on multiple electric phases simultaneously.

Specifically, according to one or more embodiments of the disclosure as described in detail below, a device in a network receives a message from a neighboring device that identifies the electrical phase on which the message was sent. Crosstalk is identified between the device and the neighboring device by determining that the message was received on a different electrical phase than the phase on which the message was sent. One or more distinct communication channels between the device and the neighboring device are identified based on the identified crosstalk with each communication channel including or more electrical phases.

Illustratively, the techniques described herein may be performed by hardware, software, and/or firmware, such as in accordance with PLC process 248, which may contain computer executable instructions executed by the processor 220 to perform functions relating to the novel techniques described herein. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Operationally, FIGS. 7A-7D illustrate a simplified example of a device/node identifying communication channels based on crosstalk information. In particular, a PLC network, such as network 100, may include a set of network devices 702, 704 that are configured to receive and/or transmit data between one another using a shared media (e.g., power lines 160). Network devices 702, 704 may be configured to communicate simultaneously using different electrical phases to which the devices are connected. For example, network devices 702, 704 may be configured to communicate on any or all of phases P1-P3 of a three-phase electrical power distribution network.

Figure 7A:
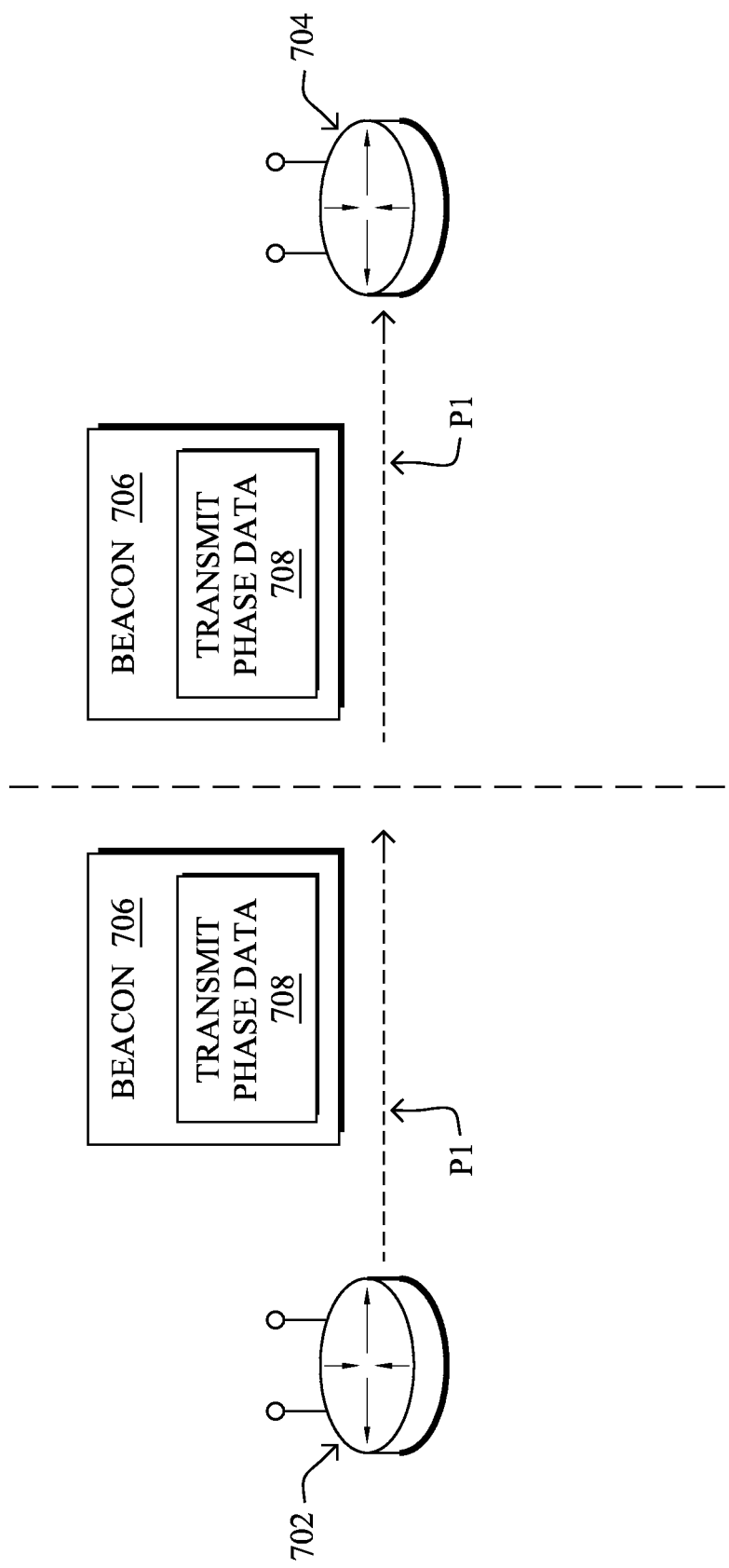
FIGS. 7A-7D illustrate a simplified example of a device/node identifying communication channels.

As shown in FIG. 7A, network device 704 may determine which phases are connected to neighboring device 702 and determine the degree of crosstalk between these phases present when communicating with neighboring device 702. According to various embodiments, devices 702, 704 may use a beacon mechanism to convey phase information to neighboring devices. In a typical mesh network system, each node/device may occasionally transmit a beacon message (e.g., an IEEE 802.15.4e-2012 Enhanced Beacon message), to announce their presence and support neighbor discovery. In one embodiment, a beacon message may be modified to include an additional field to indicate which phase was used to transmit the beacon. For example, neighboring device 702 may transmit a beacon 706 to device 704 that includes transmit phase data 708 which indicates that beacon 706 was transmitted by device 702 on phase P1. In some embodiments, such a beacon message may be transmitted individually on each phase connected to neighboring device 702. In a simple case, as shown, device 704 may receive beacon 706 on phase P1, compare transmit phase data 708 to the phase on which beacon 706, and determine that beacon 706 was received on the same phase on which beacon was sent. Device 704 may also records link quality metrics (e.g. RSSI, LQI, etc.) for all electric phases to which device 704 is connected, to identify the degree of crosstalk present between phases.

Figure 7B:
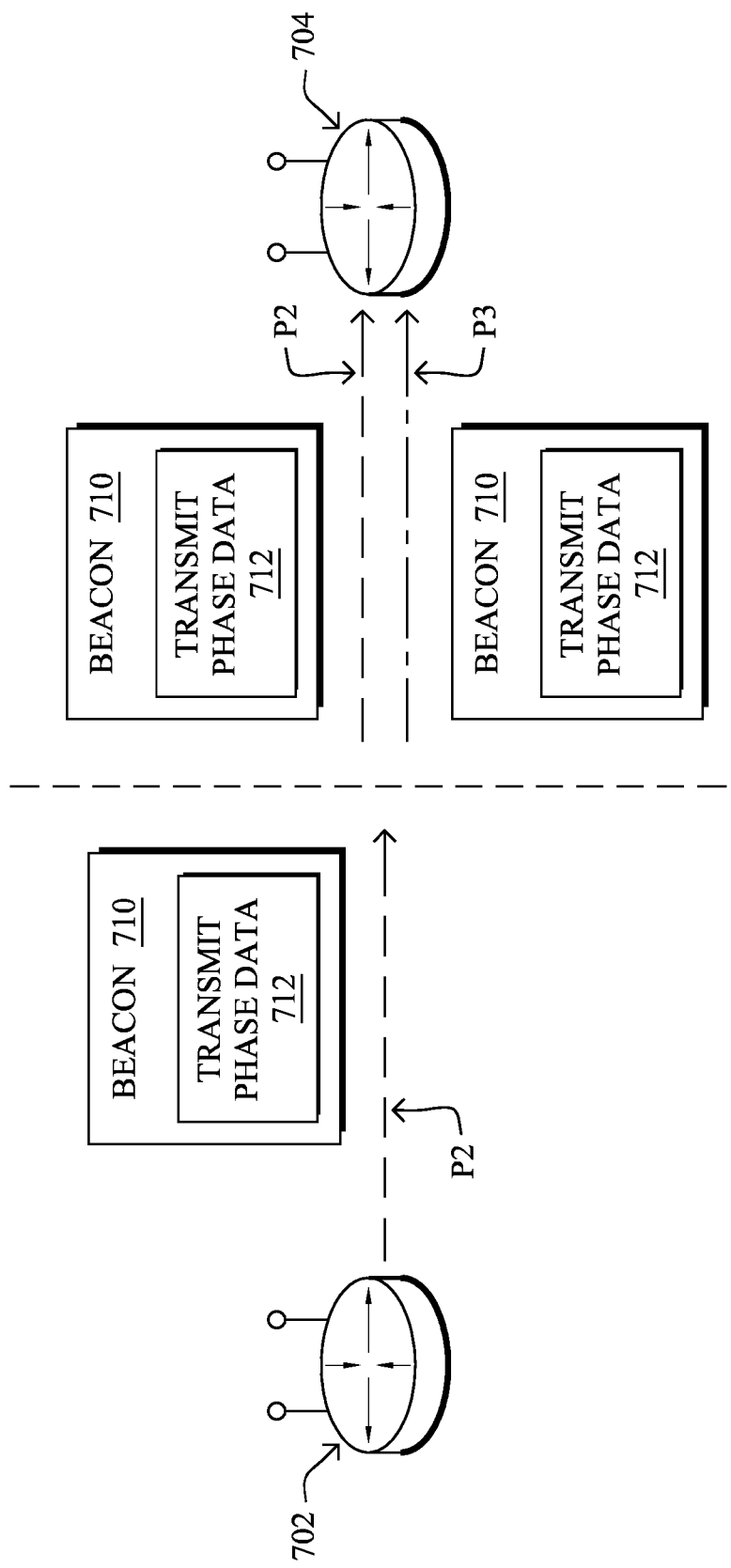
Figure 7C:
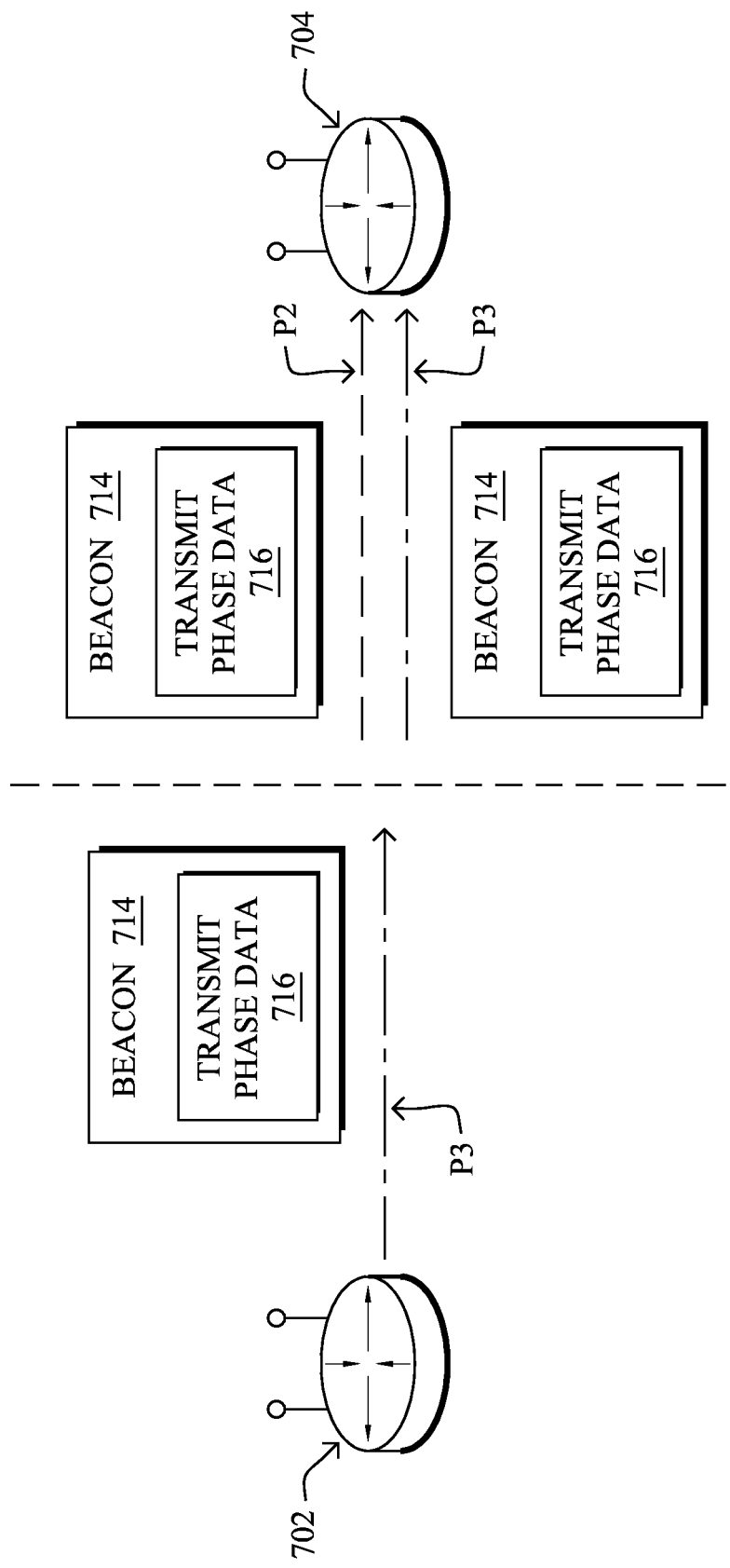

FIGS. 7B-7C illustrate additional beacon messages 710 and 714 being sent by neighboring device 702 to device 704 via phases P2 and P3, respectively. In these cases, however, crosstalk may exist between phases P2 and P3. In other words, device 704 may receive beacon message 710 on phase P2 and/or on phase P3, despite neighboring device 702 sending beacon message 710 via phase P2, as illustrated in FIG. 7B. Similarly, device 704 may receive beacon message 714 on phase P2 and/or on phase P3, despite beacon message 714 being transmitted on phase P3, as shown in FIG. 7C.

In various embodiments, a device receiving a beacon message may use phase data included in the beacon message to identify the presence of crosstalk with a neighboring device. For example, device 704 receiving beacon messages 706, 710, and 714 may measure the degree of crosstalk that exists between device 704 and neighboring device 702. Device 704 may measure the degree of crosstalk in any number of ways. In one embodiment, device 704 records metrics regarding any phase on which a beacon message was received such as signal strength indication (RSSI) data, link quality indication (LQI) data, etc. In another embodiment, device 704 may attempt to recover these metrics based on a beacon message received on a single electric phase (e.g., by maintaining a history of RSSI measurements, computing bit-errors for the demodulated signal on other phases, etc.). In other words, a device receiving a beacon message containing phase data records what phase the neighboring device is connected to and attempts to determine the degree of crosstalk between the two devices. By receiving multiple beacons from a neighboring device, a device can determine what electric phases may be used for communication and the degree of crosstalk. For example, device 704 may determine that neighboring device 702 can communicate on each of phases P1-P3, but that crosstalk exists between phases P2 and P3. Device 704 may further store this crosstalk and phase information in its neighbor table or another location.

In one embodiment, the beaconing occurs at a rate independent of the time-domain variance in crosstalk (e.g., at a fixed rate or based on Trickle timer). In another embodiment, the beaconing rate may occur based on the time-domain variance in crosstalk. In particular, if the crosstalk variance has a short time-constant, the beaconing rate may be increased to increase the number of samples. Conversely, if the crosstalk variance has a long time-constant, the beaconing rate may be decreased to also decrease the number of samples.

Figure 7D:
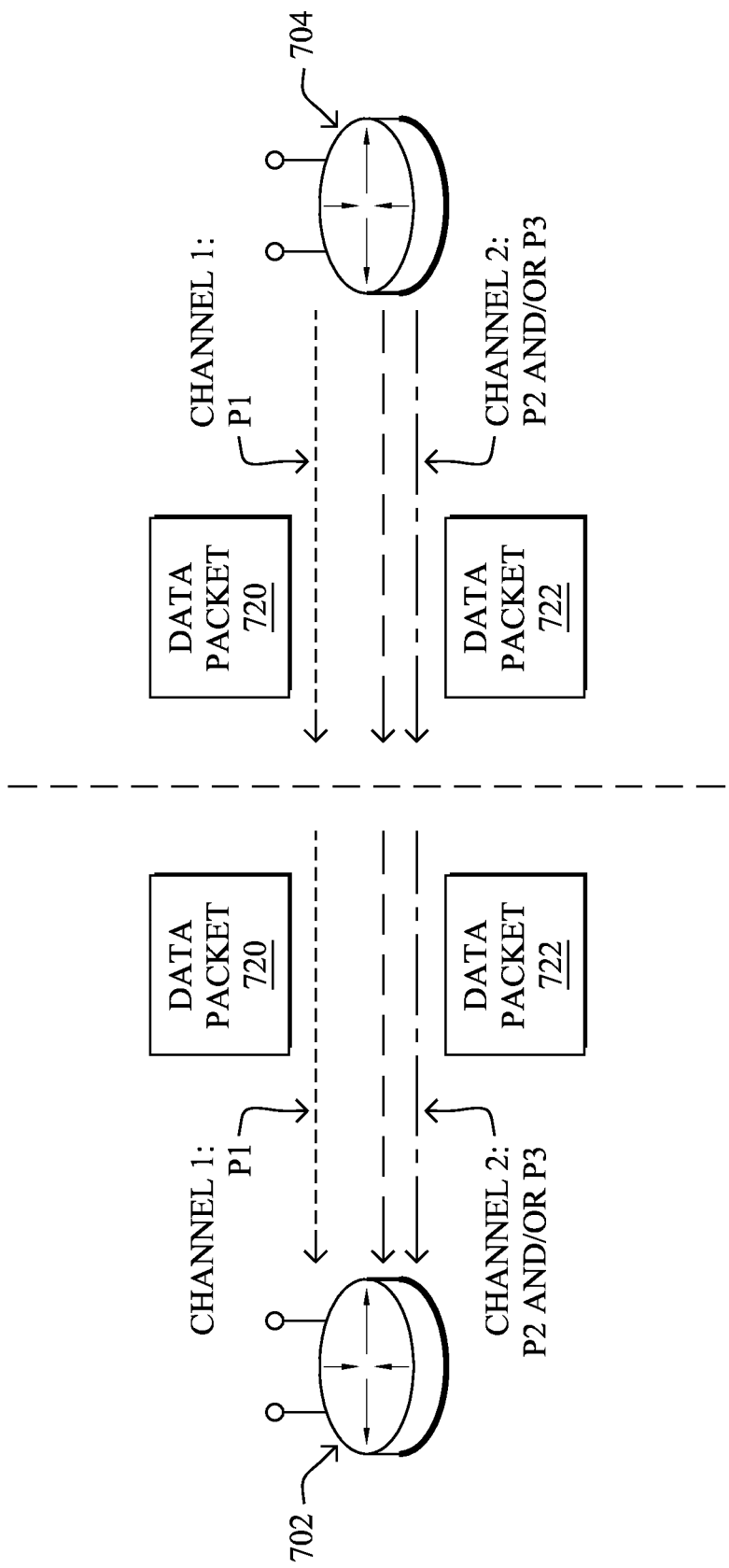

FIG. 7D illustrates a simplified example of device 704 using the crosstalk information stored in its neighbor table to determine how to transmit packets to neighboring device 702. Using the crosstalk information obtained from a neighbor, such as neighboring device 702, device 704 may determine how many distinct packets it can transmit simultaneously to neighboring device 702 via distinct communication channels. For example, if both of devices 702, 704 are connected to two electric phases and no crosstalk occurs between the two phases, device 704 may communicate packets on both phases simultaneously using the two phases. If two phases experience crosstalk, however, then device 704 may only communicate a single packet at a time. In other words, the crosstalk and phase data associated with neighboring device 702 may be used to determine how many distinct communication channels exist with neighboring device 702.

In one example, as shown, device 704 may determine that a first communication channel may exist on phase P1 since it does not experience any crosstalk with any other phase. Since phases P2 and P3 experience crosstalk, device 704 may identify either or both phases as a separate communication channel from that of phase P1, since they do not experience crosstalk with neighboring device 702. For example, assume that both of devices 702, 704 are only able to communicate on phases P1 and P2. Since both phases do not experience crosstalk, each phase may be identified as a separate communication channel between devices 702, 704. Note that it is also possible for the neighboring devices 702, 704 to be connected to different phases. For example, device 704 may be connected to phases P1 and P2, while device 702 may be connected to P2 and P3. In some rare cases, it may be possible for device 704 to transmit on both connected phases simultaneously if phase P1 exhibits crosstalk with phase P3 and not phase P2, according to one embodiment.

Thus, device 704 (or another device having access to the phase and crosstalk data), may determine how many parallel communication channels exist between device 704 and neighboring device 702 using the phase and crosstalk data. If only one distinct channel exists, then device 704 communicates only a single packet at a time. However, if more than one distinct channel exists, device 704 may communicate multiple packets at a time. As shown, for example, both of devices 702, 704 are connected to phases P1 and P2 and these phases do not exhibit crosstalk. Accordingly, device 704 may transmit data packets 720, 722 in parallel using both of these channels/phases. In one embodiment, two different packets are communicated in whole across the distinct channels simultaneously. In another embodiment, a single packet is coded across the distinct channels and transmitted simultaneously. The coding rate may be adjusted to increase redundancy (e.g., for increased robustness) or to increase throughput (e.g., for decreased latency).

A device, such as device 704, may use the crosstalk data stored in its neighbor table to determine how to transmit packets to neighboring devices in a number of ways. As discussed above, device 704 may determine how many distinct channels exist when communicating to a single neighbor, such as neighboring device 702. In one embodiment, this process may be expanded to consider multiple neighboring devices. For example, device 704 may transmit data simultaneously on phases P1 and P2 to communicate with neighboring device 702 and another neighboring device as long as crosstalk does not affect reception by either neighboring device. In other words, device 704 may choose to communicate packets simultaneously to the same destination or to different destinations. In one embodiment, device 704 may communicate the same packet to different destinations to implement 1+1 forwarding techniques. In another embodiment, device 704 may communicate different packets to different destinations and increase the overall network capacity.

Figure 8:
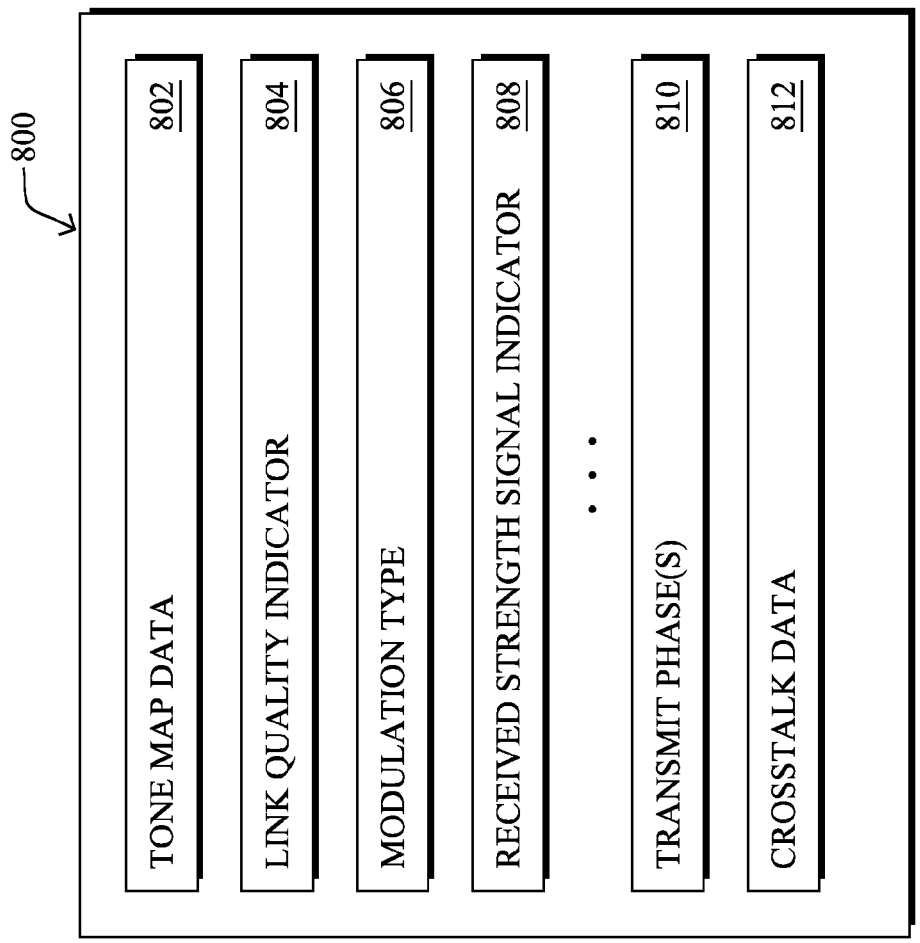
FIG. 8 illustrates an example tone map response that includes cross-talk data.

According to various embodiments, crosstalk and phase data may be utilized within a tone mapping mechanism between devices in the network. One such mechanism is specified in IEEE 1901.2, which defines a Tone Map Request (TMREQ) and Tone Map Response (TMREP) exchange to allow a device to determine what transmission parameters (i.e., tone mask, modulation, transmit power, etc.) to use when transmitting to a neighbor. In one embodiment, a TMREP message may be modified to include phase data (e.g., on which phase(s) the response was sent) and/or crosstalk information (e.g., the degree of crosstalk between phases that was identified by the sending device). For example, as shown in FIG. 8, a TMREP message 800 may include various data, such as tone map data 802, LQI data 804, modulation type data 806, RSSI data 808, or any other data that may be included in a TMREP message. TMREP message 800 may further include transmit phase data 810 that denotes on which phase or phases TMREP message 800 was sent. TMREP message 800 may also include crosstalk data 812 that denotes on which phases, if any, crosstalk was identified. In one embodiment, crosstalk data 812 may include a list of which phases experience crosstalk and should not be used for simultaneous transmission. In another embodiment, crosstalk data 812 may indicate the degree of crosstalk between one phase and another (i.e., in terms of attenuation, signal strength, etc.).

Figure 9A:
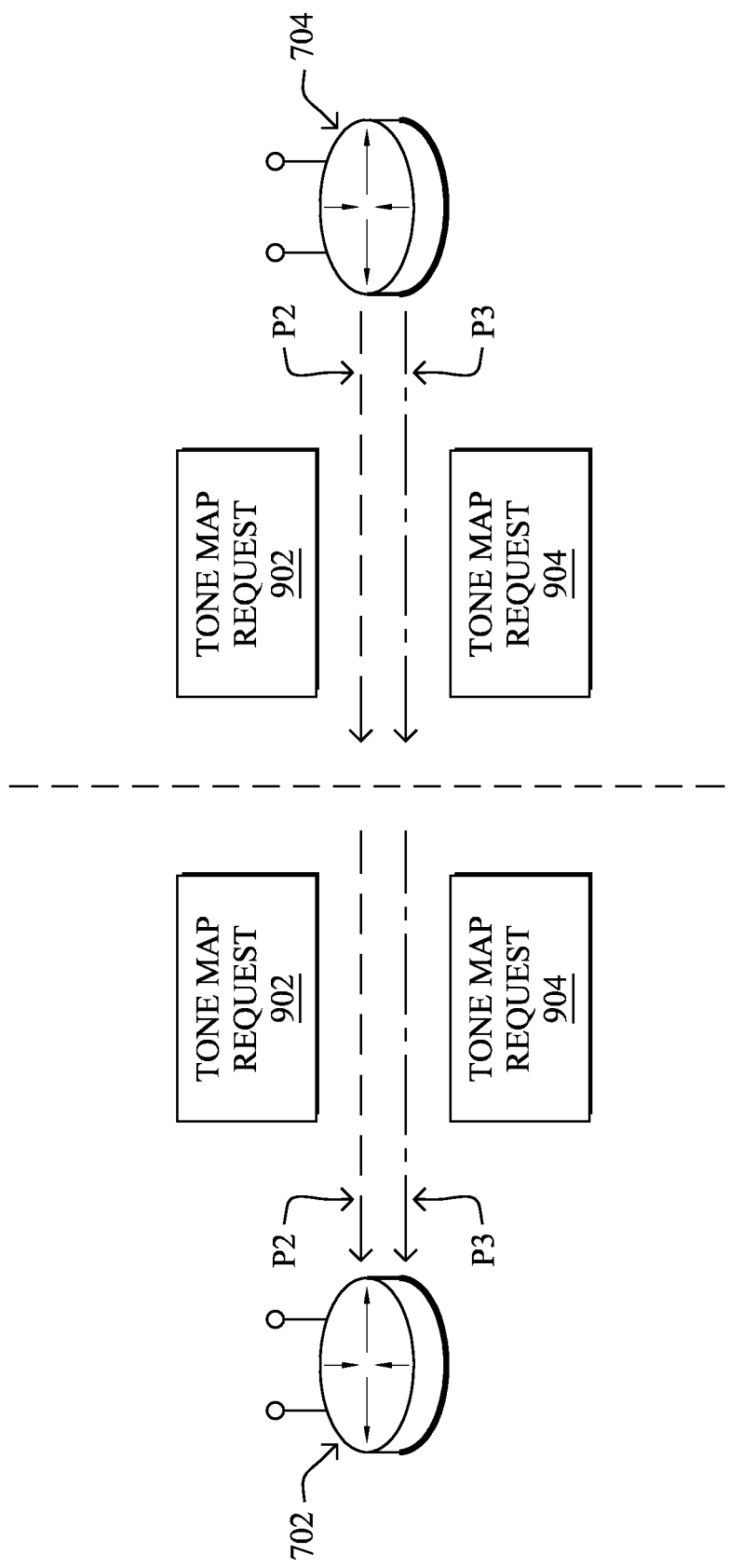
FIGS. 9A-9B illustrate a simplified example of a device validating a communication channel.
Figure 9B:
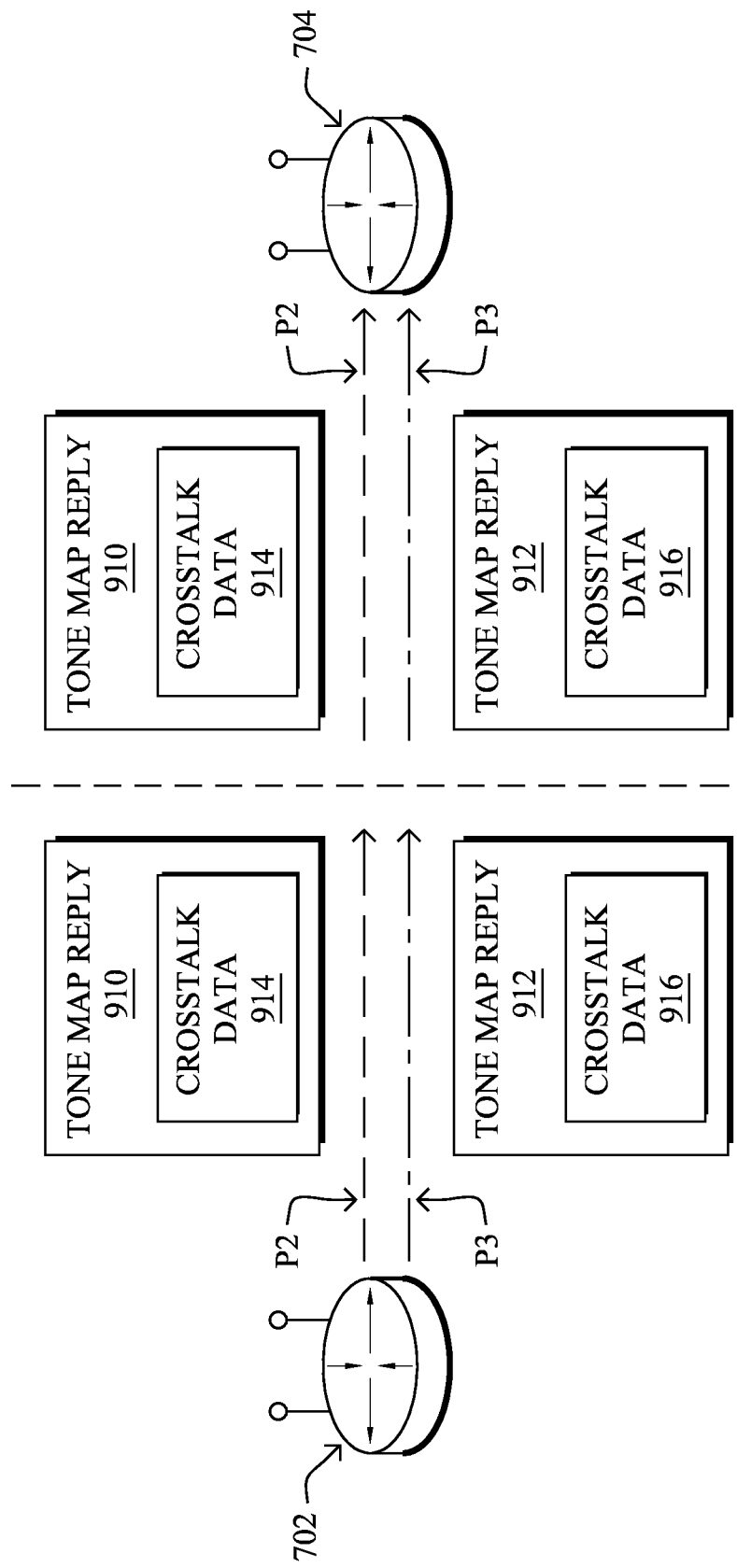

In some embodiments, TMREQ and TMREP exchanges between devices may be used to test simultaneous transmissions. As shown in FIGS. 9A-9B, for example, a TMREQ and TMREP exchange may be conducted between devices 702, 704, to test whether the devices can communicate simultaneously on different phases, such as phases P2 and P3. In some cases, physical layer observations (e.g., RSSI, LQI, etc.) may not be sufficient to determine if crosstalk prevents simultaneous transmissions. In such a case, a device may utilize the TMREQ and TMREP exchange to probe the link. In particular, two distinct TMREQ messages may be sent on the different electric phases. For example, assume for purposes of illustration that devices 702, 704 are both connected to phases P2 and P3 and that device 704 needs to probe whether these phases can be used as distinct communication channels. In such a case, device 704 may send distinct TMREQ messages 902, 904 to neighboring device 702 on phases P2 and P3, respectively. Of note is that when sending the same TMREQ message, it is not possible to distinguish whether or not crosstalk exists.

In response to receiving TMREQ messages as part of a probe, the receiving device may determine whether or not it was able to receive the messages and on which phases. The neighbor may then respond with a TMREP message containing phase and crosstalk data from the TMREQ messages, to communicate the observations back to the probing device. For example, as shown in FIG. 9B, neighboring device 702 may respond to device 704 with a TMREP message 910 and/or TMREP message 912 having a format similar to that shown in FIG. 8. In other words, TMREP messages sent in reply to device 704 may include crosstalk data 914 or 916, respectively, that denotes any crosstalk or degree of crosstalk identified by neighboring device 702. In turn, device 704 may use the received crosstalk data to determine whether distinct communication channels exist between devices 702, 704 (e.g., on phases P2 and P3) or whether crosstalk effects limit the number of communication channels (e.g., only one phase may be used for communications).

In some embodiments, links between nodes may also be optimized as a function of time. In one embodiment, a node may determine the level of crosstalk with its neighbor as a function of time and provides this information to the network root, such as the root of a directed acyclic graph (DAG) used to route data in the network. By observing the traffic matrix, it may be able to determine whether the DAG root should be optimized according to time (e.g., between time T1 and T2, select next hop Y instead of Z, since Y provides a temporary higher bandwidth). In other words, this information could be used in order to perform "local policy routing" according to the time, since the routing metrics may likely not be dynamically adjusted if the phenomena (e.g., no crosstalk for 10 minutes every day between time T1 and T2) is not long term.

Figure 10:
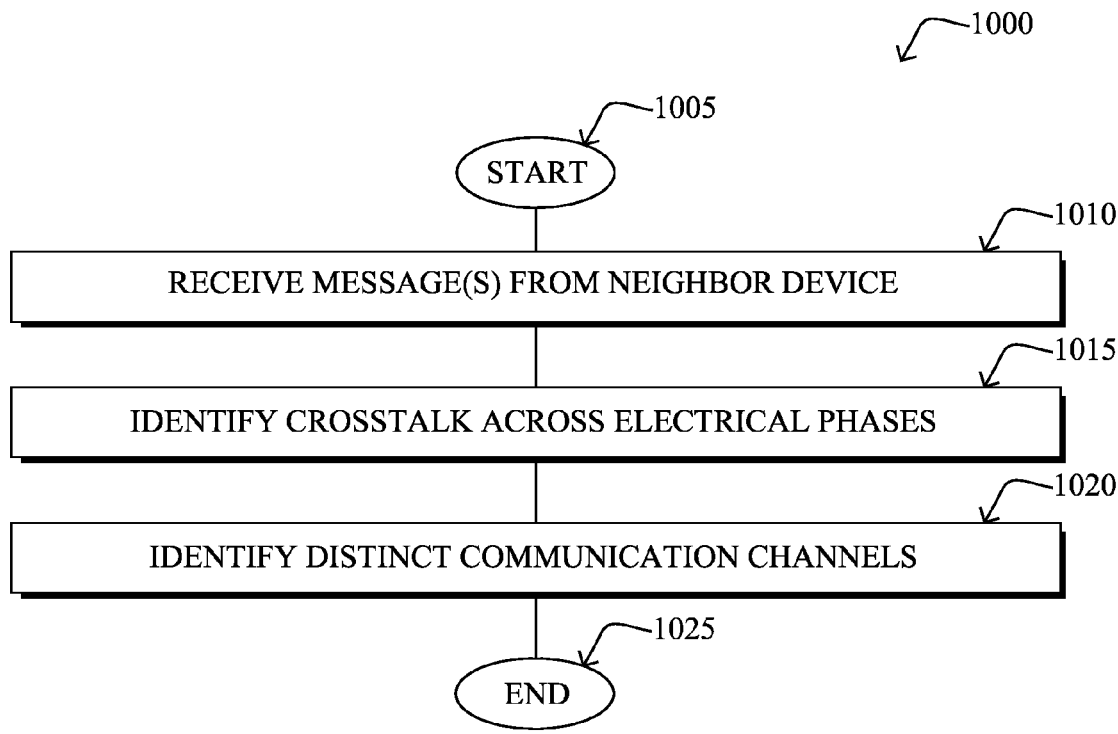
FIG. 10 illustrates an example simplified procedure for identifying distinct communication channels based on identified crosstalk effects.

FIG. 10 illustrates an example simplified procedure for identifying distinct communication channels based on identified crosstalk effects, in accordance with one or more embodiments described herein. The procedure 1000 may start at step 1005, and continues to step 1010, where, as described in greater detail above, one or more messages are received from a neighboring device. Such messages may include data regarding on which electrical phase or phases the received message was sent. For example, a device may receive a message from a neighboring device that indicates that the message was sent on a particular electrical phase. In one embodiment, the received message or messages may be beacon messages, such as those used as part of a device discovery mechanism.

At step 1015, crosstalk effects across the electrical phases connected to the device are identified. As detailed above, the device receiving the message(s) containing the phase data may use the phase data to identify whether crosstalk exists. For example, if the message was sent on one phase and received on a different phase, this indicates that crosstalk exists. In one embodiment, the device may use metrics regarding the physical layer to determine a degree of crosstalk, such as using RSSI data, LQI data, etc. In one embodiment, the device may determine whether crosstalk exists based solely on a message received on a single phase. For example, the device may analyze a history of physical layer metrics (e.g., RSSI data, etc.), to determine whether crosstalk exists.

At step 1020, one or more distinct communication channels are identified based on the phase and crosstalk data from steps 1010-1015. As described in greater detail above, a distinct communication channel in a poly-phase network may correspond to one or more electrical phases that may be used to communicate data. In various embodiments, electrical phases that do not exhibit crosstalk may be identified as distinct communication channels. For example, if a device is connected to phases P1 and P2 and these phases exhibit crosstalk, the device may determine that a single communication channel exists. Conversely, if crosstalk does not exist between phases P1 and P2, the device may determine that each phase can be used as a distinct communication channel (e.g., to send data in parallel over the two channels). Procedure 1000 then ends at step 1025.

Figure 11:
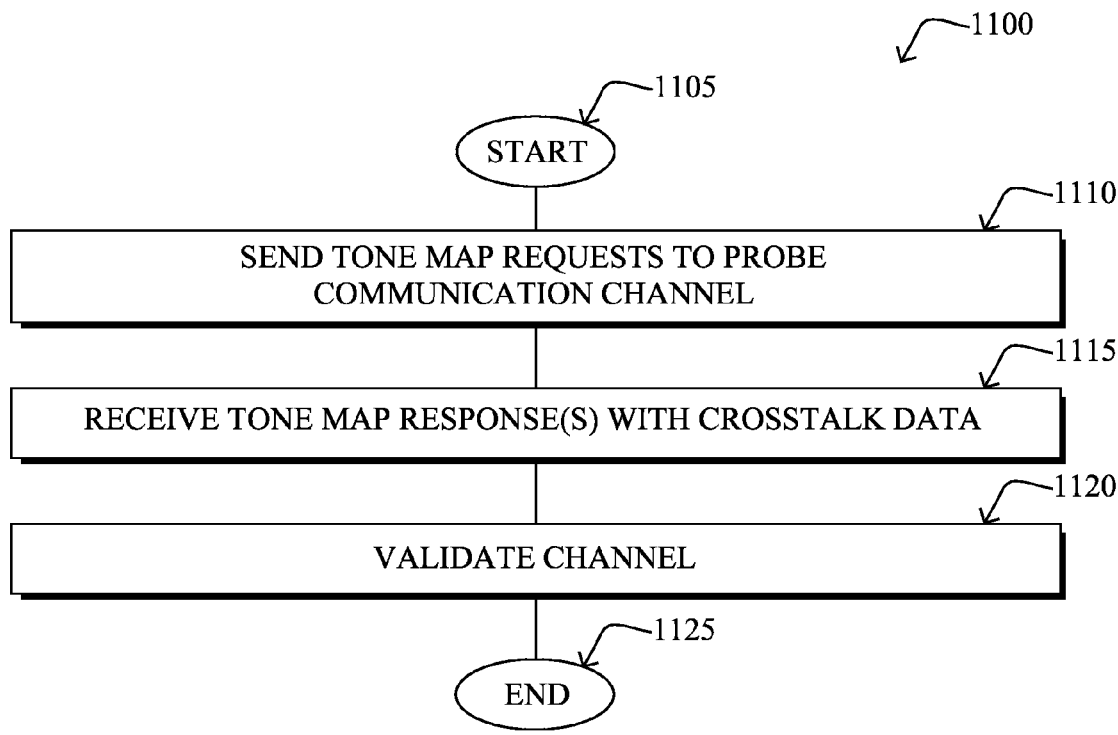
FIG. 11 illustrates an example simplified procedure for probing a communication link between devices.

FIG. 11 illustrates an example simplified procedure for probing a communication link between devices. The procedure 1100 may start at step 1105, and continues to step 1110, where, as described in greater detail above, tone map request (TMREQ) messages may be sent on different PLC phases to probe a communication channel. For example, a node that is connected to phases P1, P2, and P3 may send TMREQ messages along each of these phases to probe the communication channels between the node and another node. As detailed above, the TMREQ messages may be sent in parallel and may include data that indicates on which phase a given message was sent. For example, the TMREQ message sent on phase P1 may indicate that the message was sent on phase P1.

At step 1115, as described in greater detail above, a tone map response (TMREP) message is received that includes crosstalk data. For example, assume that a particular TMREQ message was sent on electrical phase P1 but was received on phase P2 due to crosstalk effects. In such a case, the receiving device may respond to the sender with a TMREP message that indicates that phases P1 and P2 exhibit crosstalk effects. In various embodiments, a TMREP message may be sent for each received TMREQ message or a single TMREP message may be sent that includes data regarding each of the received TMREQ messages.

At step 1120, as detailed above, a particular channel is validated based on the received one or more TMREP messages. In general, the validation may entail determining whether a particular channel (e.g., an electrical phase in a PLC link) is a viable channel over which data may be sent. Such a validation may entail, for example, determining whether the signal strength of a sent TMREQ message is above a threshold amount, determining whether different phases experience crosstalk, determining whether a TMREQ message sent on a particular phase was even received, combinations thereof, and the like. Once validated, the device may use the validated channel to communicate data to the second device. Procedure 1100 then ends at step 1125.

It should be noted that while certain steps within procedures 1000-1100 may be optional as described above, the steps shown in FIGS. 10-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000-1100 are described separately, certain steps from each procedure may be incorporated into each other procedure, and the procedures are not meant to be mutually exclusive.

The techniques described herein, therefore, maximize the effectiveness of poly-phase PLC links that are capable of transmitting and receiving on different electric phases simultaneously. By having an efficient mechanism to determine where crosstalk effects exist between phases, a device can determine whether or not it is capable of utilizing multiple communication channels simultaneously. When available, multiple communication channels may be used when communicating to the same neighbor or to different neighbors, thereby increasing overall robustness and network capacity while also reducing communication latency in the network.

While there have been shown and described illustrative embodiments that provide for dynamic enabling of routing devices in a shared-media communication network, it is to be understood that various other adaptations and modifications may be made within the spirit and scope of the embodiments herein. For example, the embodiments have been shown and described herein with relation to PLC networks. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device in a network, a message from a neighboring device that identifies an electrical phase on which the message was sent;
   identifying, by the device, crosstalk between the device and the neighboring device by determining that the message was received on a different electrical phase than the phase on which the message was sent, wherein the identified electrical phase in the received message is used by the device to determine whether the message was received on a different electrical phase than the on which the message was sent;
   identifying, by the device, one or more distinct communication channels between the device and the neighboring device based on the identified crosstalk, each communication channel comprising one or more electrical phases;
   sending tone map request messages to the neighboring device on different electrical phases to probe a particular communication channel;
   receiving one or more tone map responses from the neighboring device that include cross talk observations by the neighboring device; and
   using the one or more tone map responses to validate the particular communication channel.

2. The method as in claim 1, further comprising:
   transmitting data in parallel to the neighboring device over a plurality of identified communication channels.

3. The method as in claim 2, wherein the data transmitted in parallel comprises a single packet coded across the plurality of communication channels.

4. The method as in claim 2, wherein the data transmitted in parallel comprises different data packets.

5. The method as in claim 1, wherein the message from the neighboring device is a node discovery beacon message.

6. The method as in claim 1, further comprising:
   including data regarding the identified one or more distinct communication channels in a tone map response message; and
   sending the tone map response message via the network.

7. The method as in claim 6, further comprising:
   including data regarding the identified crosstalk in the tone map response message.

8. The method as in claim 1, wherein the crosstalk is identified using link quality metrics associated with the message received from the neighboring device.

9. The method as in claim 1, further comprising:
   determining the crosstalk as a function of time; and
   reporting the crosstalk as a function of time to a root node of the network.

10. An apparatus comprising:
    one or more network interfaces configured to communicate in a network;
    a processor configured to execute one or more processes; and
    a memory configured to store a process executable by the processor, the process when executed operable to:
    receive a message from a neighboring device that identifies an electrical phase on which the message was sent;
    identify crosstalk between the device and the neighboring device by determining that the message was received on a different electrical phase than the phase on which the message was sent, wherein the identified electrical phase in the received message is used to determine whether the message was received on a different electrical phase than the on which the message was sent;

identify one or more distinct communication channels between the device and the neighboring device based on the identified crosstalk, each communication channel comprising one or more electrical phases;

send tone map request messages to the neighboring device on different electrical phases to probe a particular communication channel;

receive one or more tone map responses from the neighboring device that include cross talk observations by the neighboring device; and use the one or more tone map responses to validate the particular communication channel.

11. The apparatus as in claim 10, wherein the process when executed is operable to:

transmit data in parallel to the neighboring device over a plurality of identified communication channels.

12. The apparatus as in claim 10, wherein the message from the neighboring device is a node discovery beacon message.

13. The apparatus as in claim 10, wherein the process when executed is operable to:

include data regarding the identified one or more distinct communication channels in a tone map response message; and send the tone map response message via the network.

14. The apparatus as in claim 13, wherein the process when executed is operable to:

include data regarding the identified crosstalk in the tone map response message.

15. The apparatus as in claim 10, wherein the crosstalk is identified using link quality metrics associated with the message received from the neighboring device.

16. A tangible, non-transitory, computer-readable media having software encoded thereon, the software, when executed by a processor, operable to:

receive a message from a neighboring device that identifies an electrical phase on which the message was sent;

identify crosstalk between the device and the neighboring device by determining that the message was received on a different electrical phase than the phase on which the message was sent, wherein the identified electrical phase in the received message is used to determine whether the message was received on a different electrical phase than the on which the message was sent; and identify one or more distinct communication channels between the device and the neighboring device based on the identified crosstalk, each communication channel comprising one or more electrical phases;

send tone map request messages to the neighboring device on different electrical phases to probe a particular communication channel;

receive one or more tone map responses from the neighboring device that include cross talk observations by the neighboring device; and use the one or more tone map responses to validate the particular communication channel.

\* \* \* \* \*